United States Patent [19]
Oslin

[11] Patent Number: 4,851,644
[45] Date of Patent: Jul. 25, 1989

[54] ELECTRIC COMBINATION OVEN

[75] Inventor: G. Robert Oslin, Chicago, Ill.

[73] Assignee: Delaware Capital Formation, Inc., Wilmington, Del.

[21] Appl. No.: 50,708

[22] Filed: May 14, 1987

[51] Int. Cl.$^4$ .......................... F22B 1/28; H05B 1/02
[52] U.S. Cl. .................... 219/400; 219/401; 219/492; 219/273
[58] Field of Search ............... 219/400, 401, 440, 506, 219/492, 323, 273, 10.55 B; 126/369, 369.1, 369.2, 369.3, 21 A, 21 R, 190, 192, 194, 197; 99/473, 474, 467

[56] References Cited

U.S. PATENT DOCUMENTS

| | | | |
|---|---|---|---|
| 2,427,564 | 9/1947 | LeClaire | 126/348 |
| 3,604,895 | 9/1971 | MacKay | 126/369 |
| 3,744,474 | 7/1973 | Shaw | 126/20 |
| 3,745,988 | 7/1973 | Frick | 126/197 |
| 3,814,901 | 6/1974 | Morhack | 219/401 |
| 3,991,520 | 11/1976 | Graham | 126/192 |
| 4,010,349 | 3/1977 | Lee | 219/401 |
| 4,130,052 | 12/1978 | Jacobson | 219/405 |
| 4,345,145 | 8/1982 | Norwood | 219/506 |
| 4,506,598 | 3/1985 | Meister | 99/330 |
| 4,626,661 | 12/1986 | Henke | 219/400 |
| 4,626,662 | 12/1986 | Woolf | 219/501 |
| 4,636,621 | 1/1987 | McGeorge | 219/506 |
| 4,697,067 | 9/1987 | Rosset | 219/273 |
| 4,698,487 | 10/1987 | Meister | 219/506 |
| 4,713,528 | 12/1987 | Hirata | 219/506 |
| 4,722,268 | 2/1988 | Rightley | 219/401 |

FOREIGN PATENT DOCUMENTS 526468 9/1940 United Kingdom ................ 126/197

Primary Examiner—Teresa J. Walberg
Attorney, Agent, or Firm—Welsh & Katz, Ltd.

[57] ABSTRACT

A combination steam and dry oven has an integral boiler that is located inside the oven cavity. The combination oven can be operated as a forced-air convection oven, a forced convection oven circulating superheated steam, or a steamer near the boiling temperature of water. Sensors in the oven supply information to a microprocessor that controls heating elements to maintain an oven temperature within 10° Fahrenheit. The oven functions by circulating superheated steam by blowing its circulating gas over the surface of the internal boiler, which is protected from contamination by a baffle. Sensors of the level of water in the boiler assure that the water level either stays within predetermined limits or else shuts down the oven if the water level is out of limits. Tray stops keep foods and the trays containing them away from the walls of the oven to permit free circulation of air or superheated steam. Sensors of water temperature in the boiler and gas temperature in the circulating gas permit the control of relative humidity when the oven is used to proof dough or hold cooked food at a relatively low temperature. Control of the temperature of water in the boiler is aided by blowdown and replacement if the temperature becomes excessive. The oven may stand alone or it may be stacked as a combination of units.

9 Claims, 13 Drawing Sheets

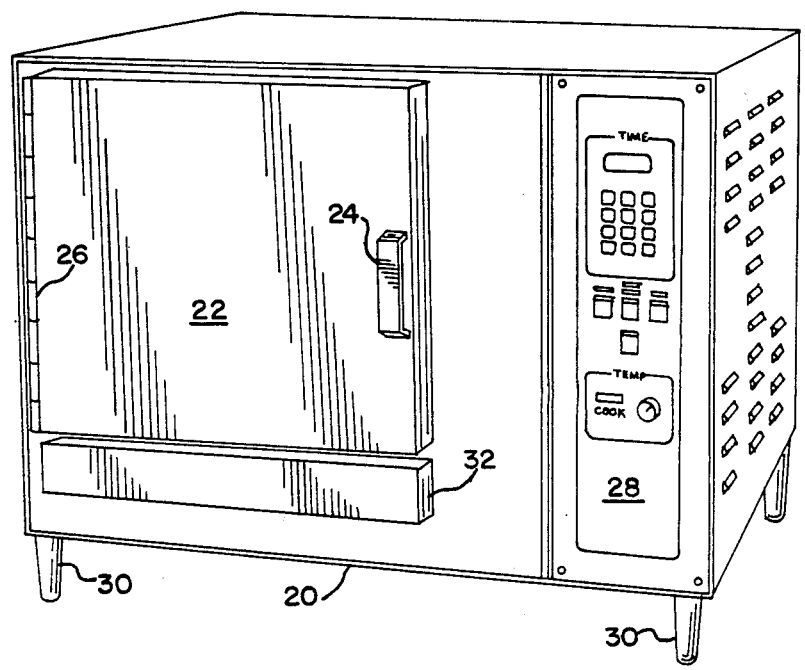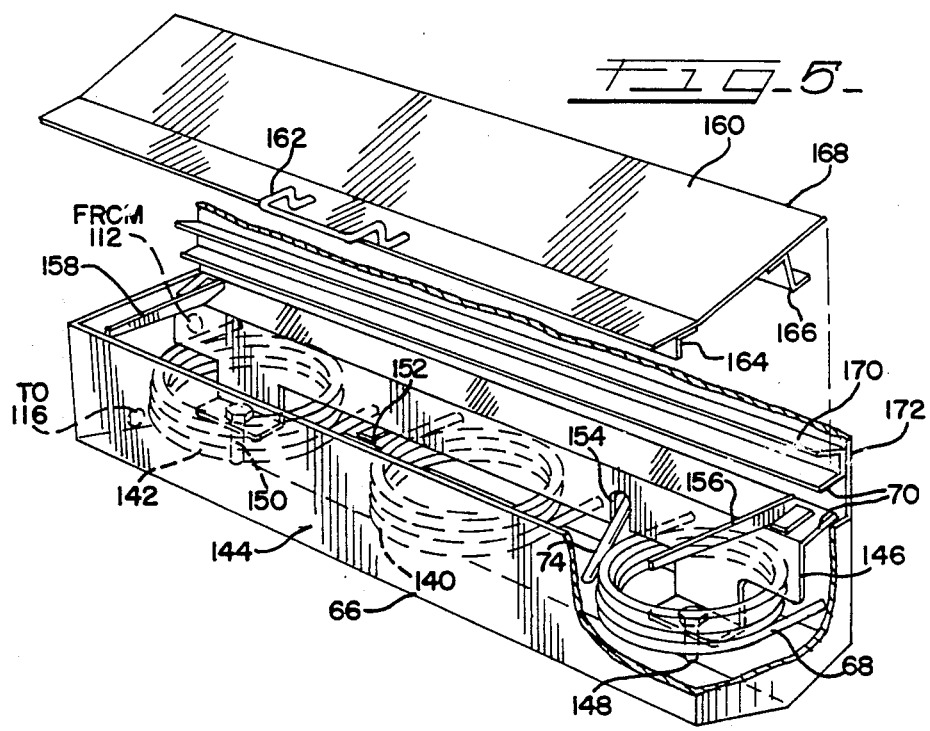

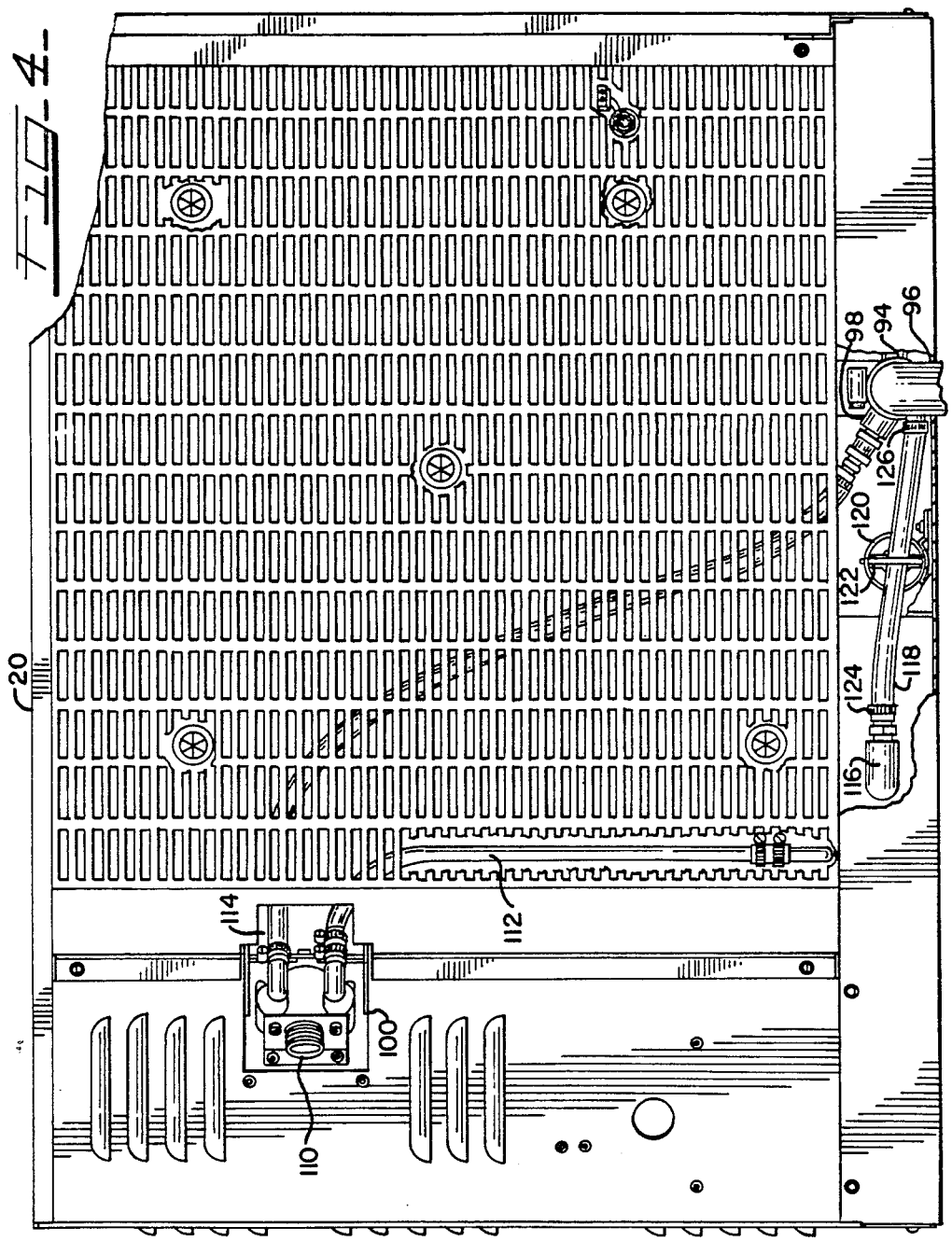

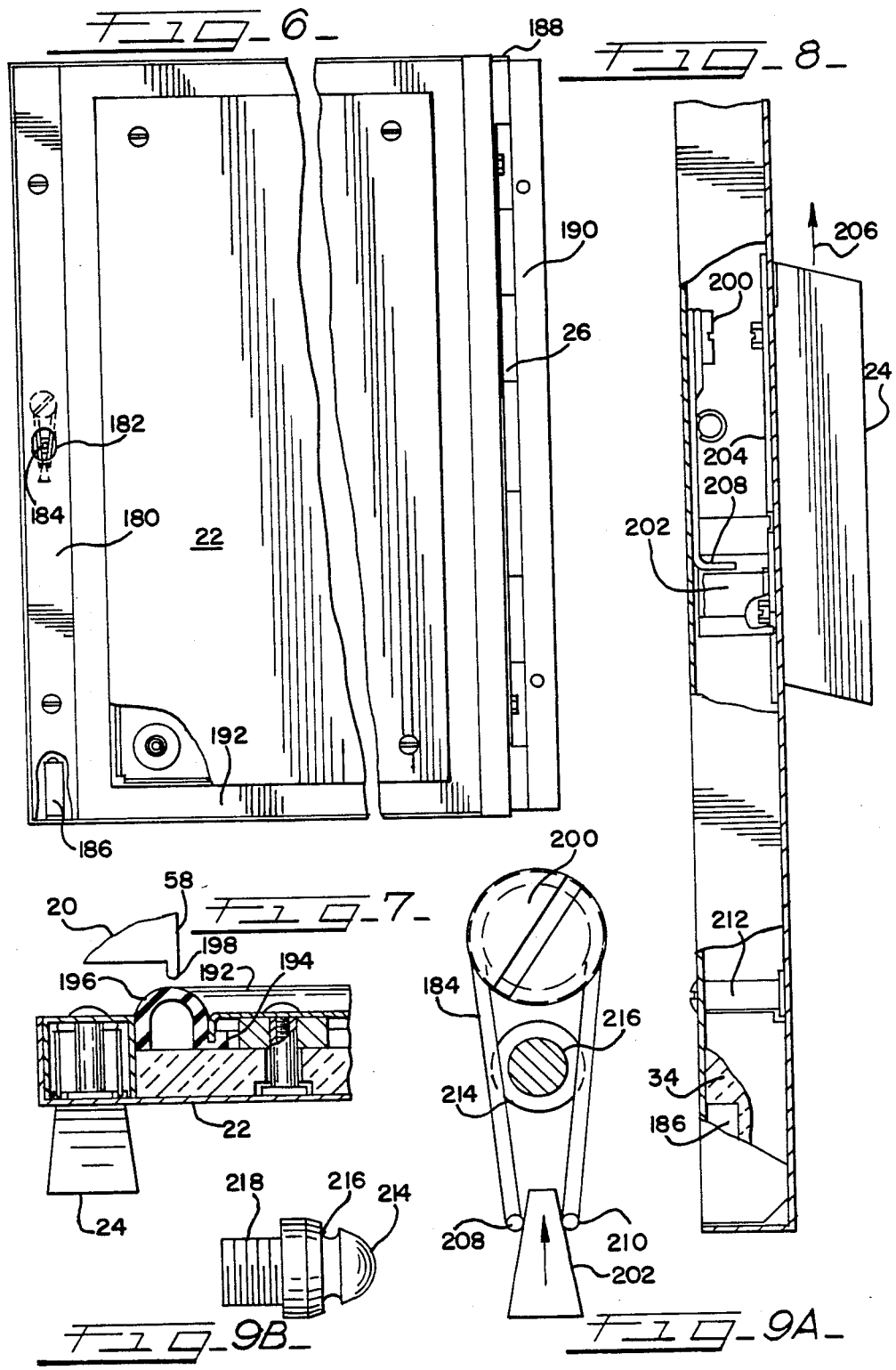

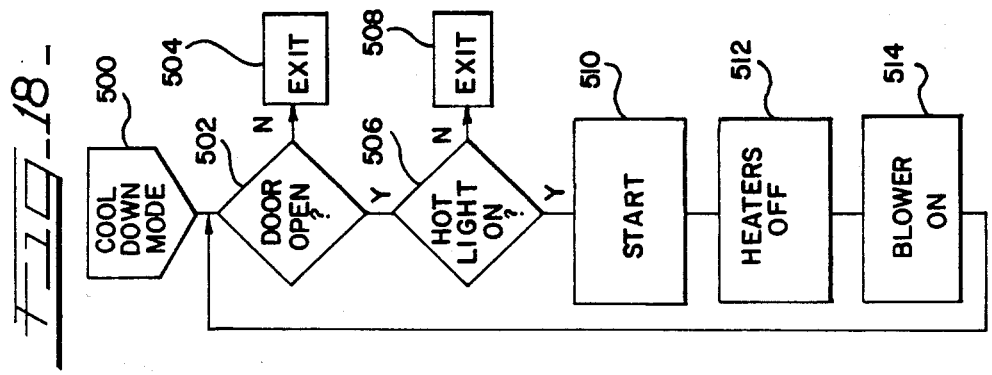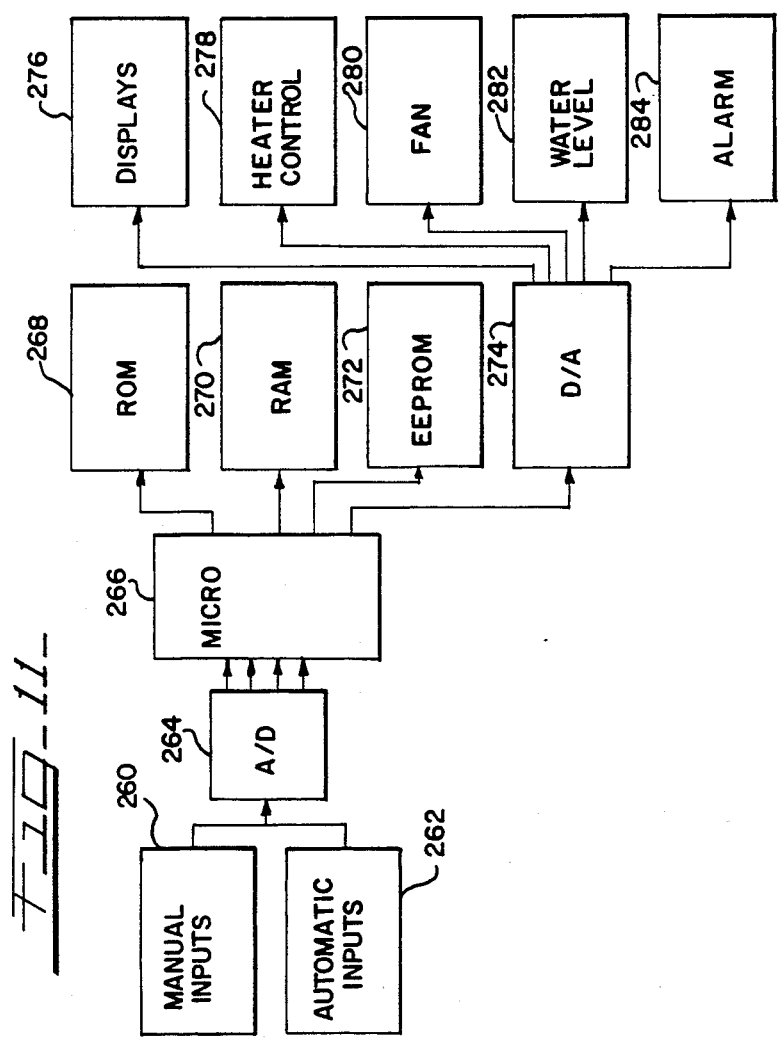

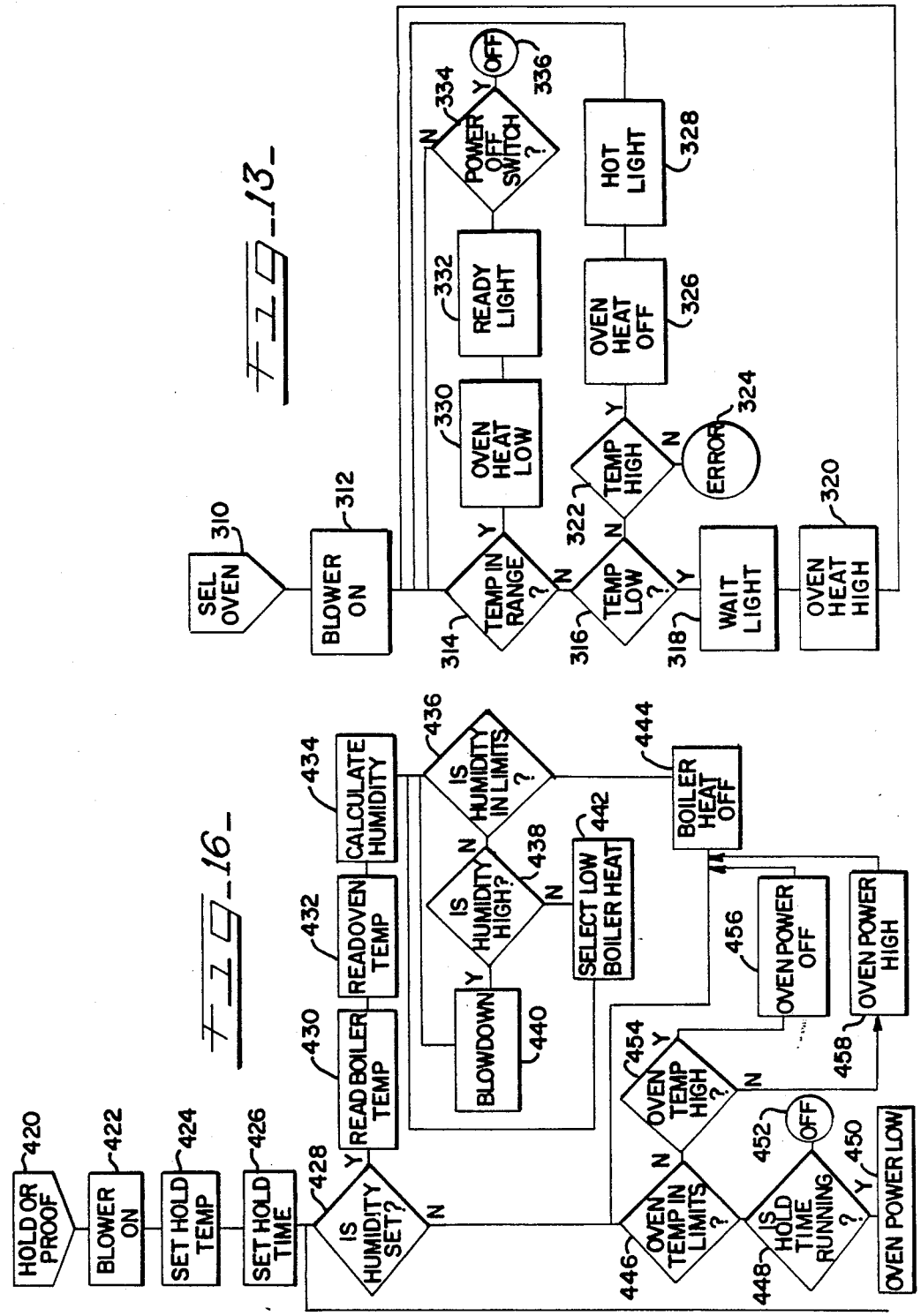

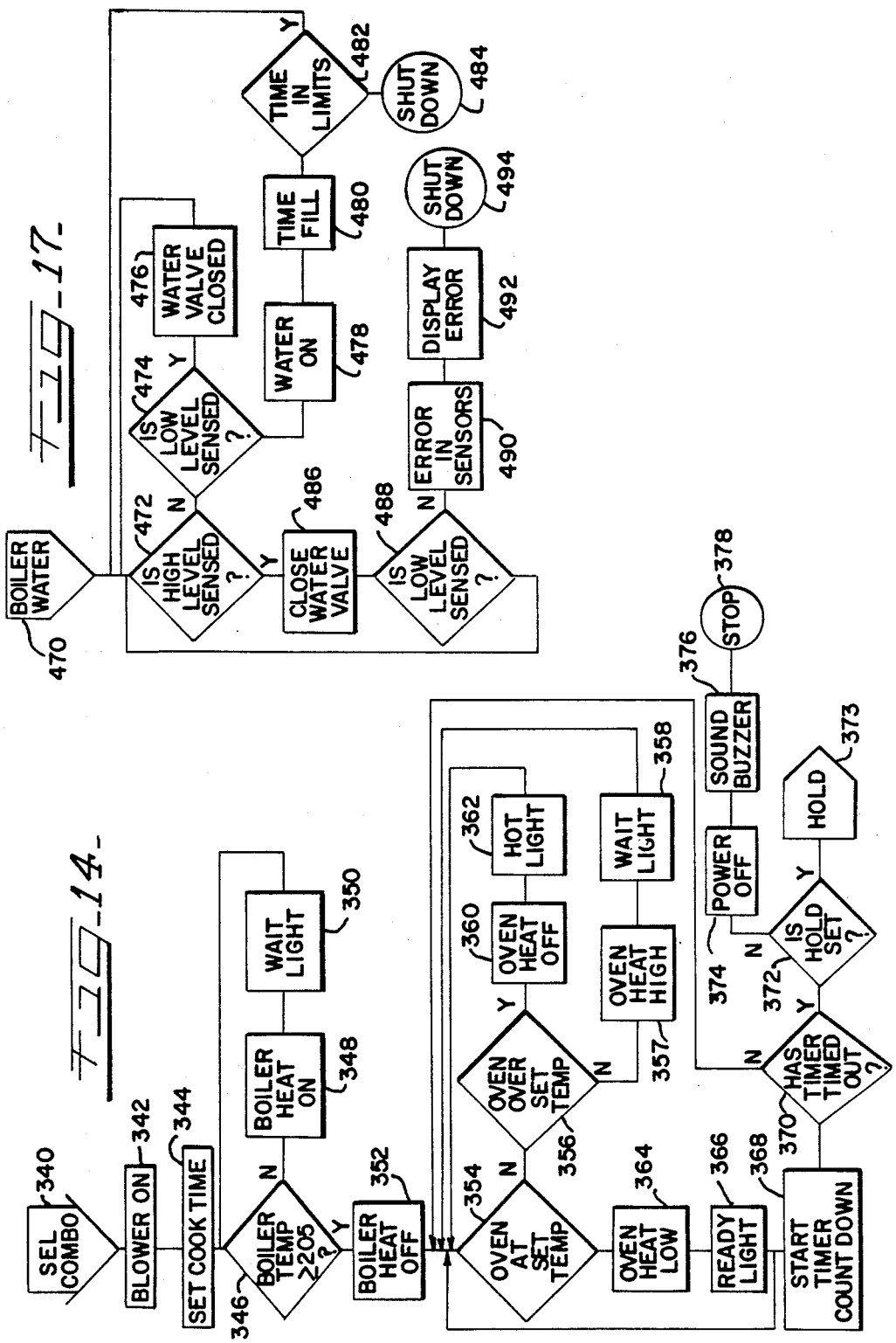

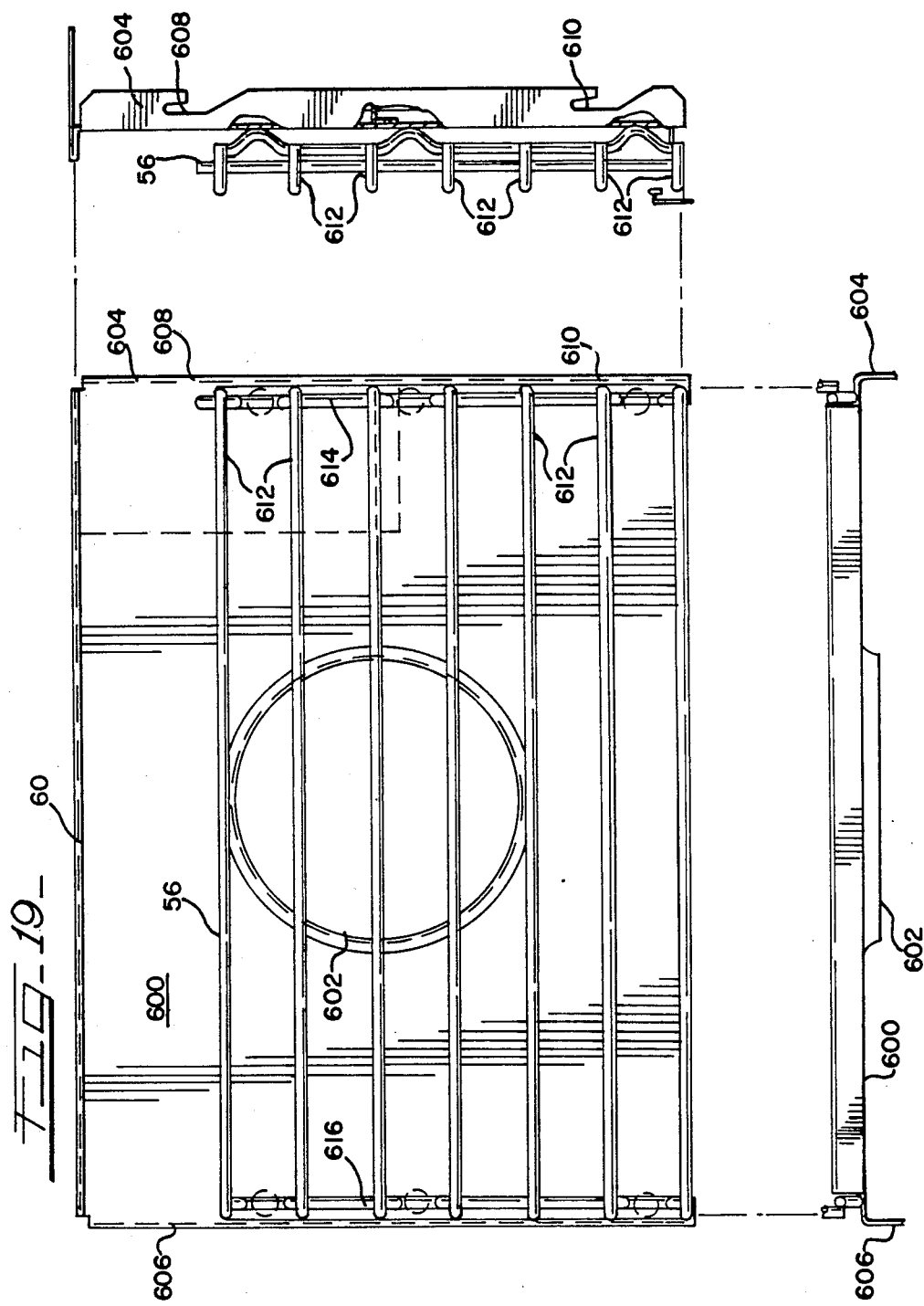

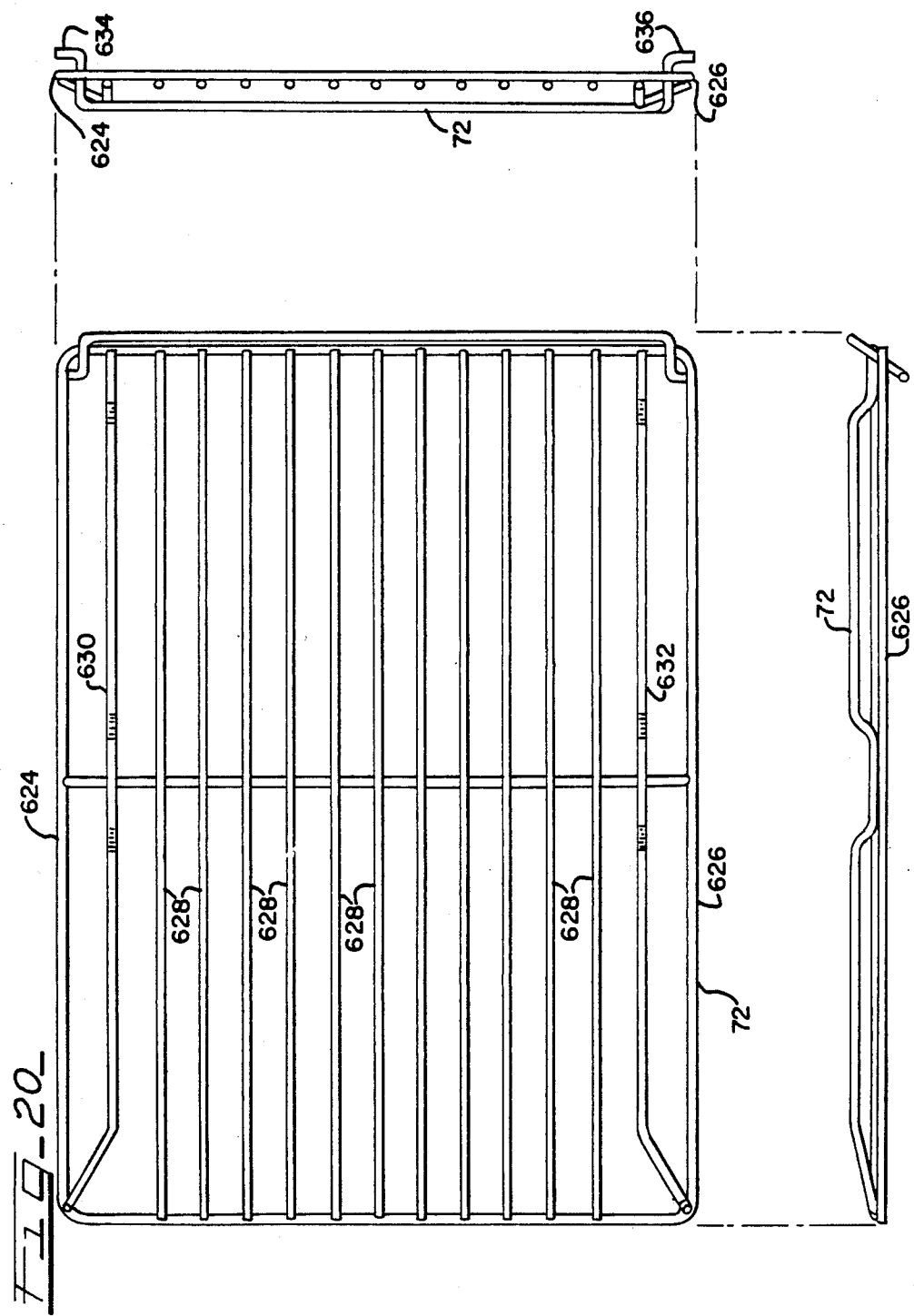

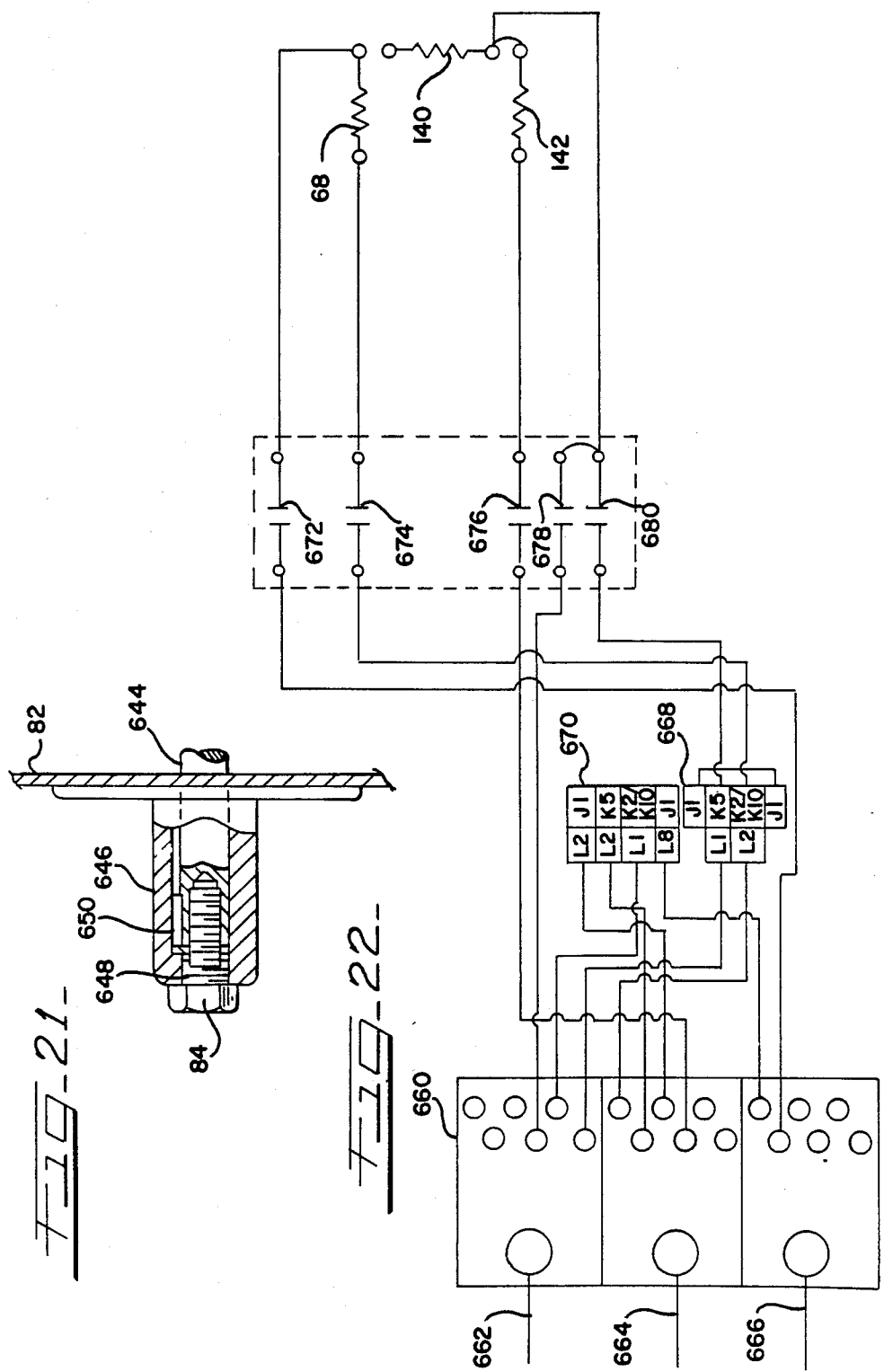

ELECTRIC COMBINATION OVEN

BACKGROUND OF THE INVENTION

This invention relates to cooking ovens. In particular, it relates to ovens for forced convection cooking with superheated steam, saturated steam, or heated air.

The art of cooking an object in an oven involves raising the core temperature of the object to a desired value while controlling the temperature and other conditions on the outside of the object to achieve a desired surface appearance. When two or more objects are placed in an oven to be cooked, an additional problem arises. That is the problem of maintaining uniformity among objects that are cooked. As time passes in the cooking cycle of a particular object, it is necessary to arrange some kind of circulation of heat to prevent stratification in the oven that might lead to uneven cooking of different objects or of different regions of the same object.

One oven function that is sometimes used to assist in cooking is to circulate steam with or in place of the hot air in the oven. The steam is produced by a boiler that typically is located outside the oven. Water is piped into the boiler and is heated by a local unit to generate steam that is conveyed into the oven for circulation. While it is common to specify a maximum level of dissolved solids in the water to be used in such a boiler, a level that normally requires softened water, it still is necessary to clean the boiler periodically to remove deposited minerals from the water as well as removing any contaminants from cooking.

Many ovens that circulate steam to cook can also be operated as steamers, holding or circulating saturated steam to thaw frozen foods, cook vegetables, or maintain cooked foods hot and ready to serve. Such a use of the oven produces condensate which must be removed from the oven without interfering with the cooking or steaming function.

Another problem in the operation of cooking ovens is that of temperature control. It is desirable to have the temperature uniform in space throughout the oven, and uniform as a function of time after the oven has come up to a particular temperature. It is not uncommon for the control range of the temperatures in both commercial and residential ovens to vary as much as 50° F. in both space and time. Variations in space can be minimized by circulating air with a blower or the like and by designing the interior of the oven to minimize the blockage of flow by pans and other containers of foods to be cooked. Variations of temperature with time are functions of temperature sensors and controllers that are used in response to them.

A further problem in cooking arises from the fact that cooking cycles sometimes require temperature changes. In such a case, it is necessary to have some means of storing a desired temperature control level for a particular time and a different temperature control level for a different period of time. Information such as this is best handled by a microprocessor with associated memories.

A complete kitchen, industrial or residential, may call for the processing of dough for bread or pastries. This includes the function known as proofing, which is the holding of dough at a controlled temperature and possibly also at a controlled humidity to enable yeast to work and raise the dough. The control of both temperature and humidity enables an oven to be used as a proofing oven.

In kitchens, industrial or residential, it is often desirable to cook overnight and hold cooked items ready to be used on a following day. This normally calls for a relatively high cooking temperature for a predetermined time, followed by holding at a lower temperature. It is often convenient when holding at the lower temperature to be able to control the humidity to prevent excessive drying of cooked items during the holding period.

SUMMARY OF THE INVENTION

It is an object of the present invention to provide a better oven for cooking.

It is a further object of the present invention to provide a novel oven that cooks by forced circulation of air.

It is a further object of the present invention to provide a novel oven that cooks by forced circulation of superheated steam.

It is a further object of the present invention to provide a novel oven that functions as a steamer.

It is a further object of the present invention to provide a novel combination oven that cooks with dry air, superheated steam, or saturated steam.

It is a further object of the present invention to provide a novel combination steam oven, dry oven, and steamer that is controlled by a microprocessor.

It is a further object of the present invention to provide a novel oven with precise temperature control in time.

It is a further object of the present invention to provide a novel oven that provides precise temperature control in space.

It is a further object of the present invention to provide a novel oven having a boiler inside the oven cavity.

It is a further object of the present invention to provide a novel oven having an internal boiler with heating elements that are readily removable from inside the oven cavity.

It is a further object of the present invention to provide a novel oven with doors that are readily convertible to open either from left or right.

It is a further object of the present invention to provide a novel oven with a seal that prevents the entry of air into the oven and the escape of steam from the oven below a certain pressure.

It is a further object of the present invention to provide a novel oven using steam or cooking or warming that includes a boiler inside the oven.

It is a further object of the present invention to provide a novel oven with an internal boiler that is protected against contamination from dripping food.

It is a further object of the present invention to provide a novel oven that can produce controlled temperatures and humidities.

It is a further object of the present invention to provide a novel forced convection oven with a fan blade that is readily removable.

Other objects will become apparent in the course of a detailed description of the invention.

A combination steam and dry oven has an integral boiler that is located inside the oven cavity. The combination oven can be operated as a forced-air convection oven, a forced convection oven circulating superheated steam, or a steamer circulating saturated steam. Sensors in the oven supply information to a microprocessor that controls heating elements to maintain an oven temperature within 5° F. or less. The oven circulates superheated steam by blowing its circulating gas over the surface of the internal boiler, which is protected from contamination by a baffle. Sensors of the level of water in the boiler assure that the water level stays within predetermined limits. Tray stops keep foods and the trays containing them away from the walls of the oven to permit free circulation of air or superheated steam. Sensors of water temperature in the boiler and gas temperature in the circulating gas permit the control of relative humidity when the oven is used to proof dough or hold cooked food at a relatively low temperature. Control of the temperature of water in the boiler is aided by blowdown and replacement if the water temperature becomes too high. The oven may stand alone or it may be stacked as a combination of multiple units.

BRIEF DESCRIPTION OF THE DRAWINGS

FIG. 1 is an isometric front view of a specific embodiment of the combination oven of the present invention.

FIG. 4 is a rear view of a specific embodiment of the combination oven of the present invention.

FIG. 5 is an isometric view of the boiler of a specific embodiment of the combination oven of the present invention.

FIG. 6 is a cut-away view of the oven door from inside the oven of FIG. 1.

FIG. 7 is a bottom view of the oven door of FIG. 6.

FIG. 8 is a cut-away side view of a portion of the oven door of FIG. 6.

FIG. 9A is a front view of the spring of FIG. 6.

FIG. 9B is a side view of a specific embodiment of a latch bullet.

FIG. 11 is a functional block diagram of a circuit for powering and controlling a specific embodiment of the combination oven of the present invention.

FIG. 13 is a flow chart of a specific sequence of operation in the oven mode.

FIG. 14 is a flow chart of a specific sequence of operation in the combination oven sequence.

FIG. 16 is a flow chart of a specific sequence of operation in the hold or proof mode.

FIG. 17 is a flow chart illustrating a specific process of control of boiler water level.

FIG. 18 is a flow chart a specific process of operation of the cool-down mode for the combination oven.

FIG. 19 is a combination front, side and bottom view of the shroud 60 of the present invention.

FIG. 20 is a combination top, side, and end view of a shelf 72 of FIG. 2.

FIG. 21 is a sectional view through the center of the shaft of the blower 82 of FIG. 3.

FIG. 22 is a connection diagram showing the means of achieving different levels of heating power using the same relays for single-phase power and three-phase power.

DETAILED DESCRIPTION OF THE PREFERRED EMBODIMENT

Figure 2:
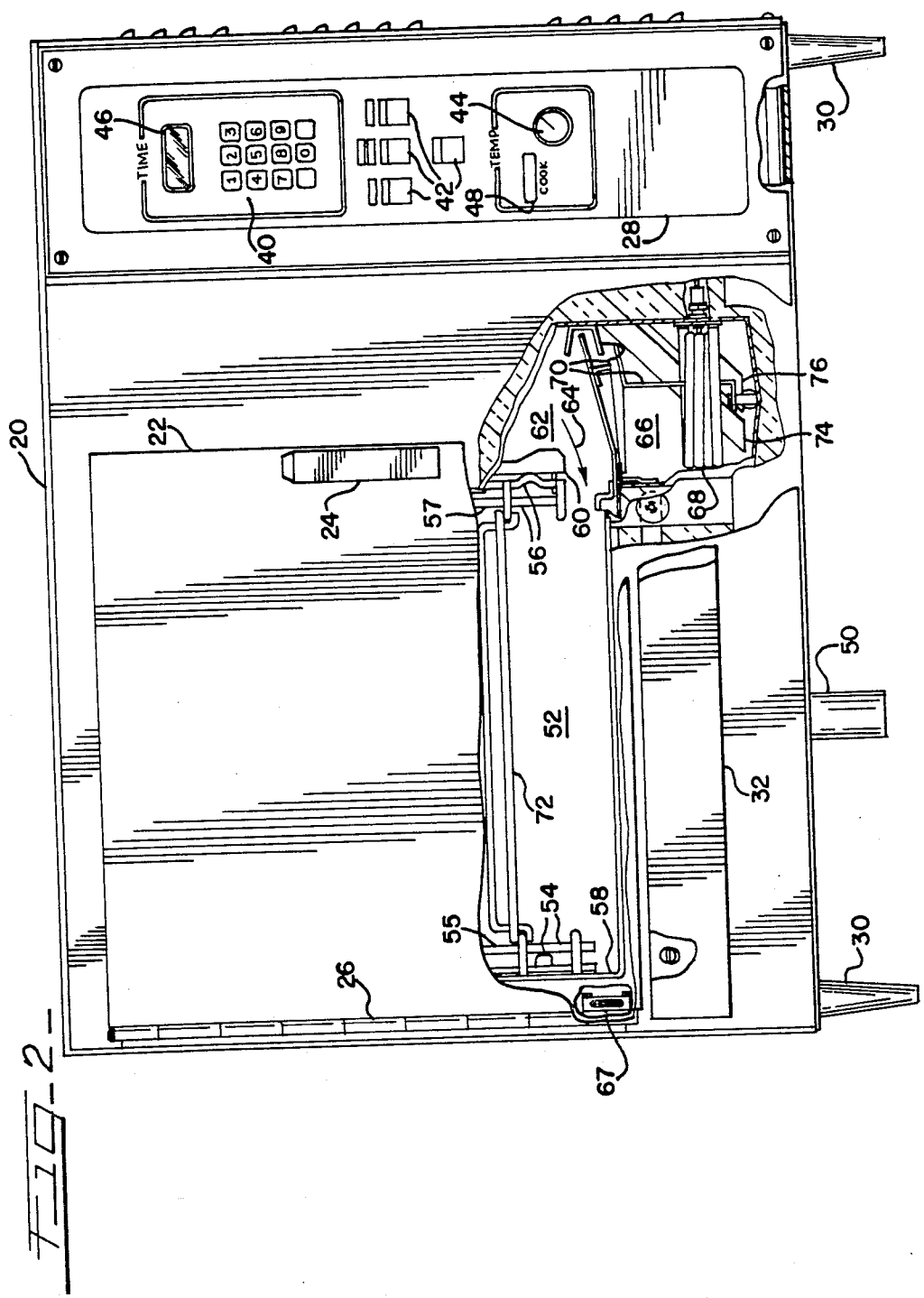
FIG. 2 is a cut-away front view of a specific embodiment of the combination oven of the present invention.

FIG. 1 is an isometric front view of a specific embodiment of a combination oven 20 of the present invention. In FIG. 1, a door 22 is shown with a hinge on the left and a handle 24 on the right. It will be seen later that the door 22 can be reversed in the field to place the handle 24 on the left and the hinges 26 on the right for use with various kitchen layouts. A control panel 28 includes controls and visual displays that will be described later in detail. Legs 30 are provided to allow the oven 20 to function as a self-standing unit, or the combination oven 20 may be used without legs. In addition, two combination ovens 20 can be stacked one above the other in a combined double unit. These are matters of design choice.

FIG. 2 is a partially cut-away front view of the combination oven 20 of the present invention. As in FIG. 1, the door 22 in FIG. 2 has the handle 24 at the right and the hinges 26 at the left. The control panel 28 includes a key pad 40, a number of push buttons 42 and a dial 44 that can be used to enter control data. A display 46 shows cooking time, diagnostic information, and other information that can be programmed by the operator. A display 48 shows the temperature selected for cooking. The legs 30 are about four inches long, which provides clearance to clean under the combination oven 20. A drain 50 carries condensate and liquid wastes to the sewer.

An oven chamber 52 is the cooking space in the combination oven 20. The oven chamber 52 includes racks 54 and 56. The rack 54 is secured to an inside wall 58 of the oven chamber 52, and the rack 56 is secured to a shroud 60 which defines a wall of the oven chamber 52 and a plenum 62. The shroud 60 is shown below in more detail. The racks 54 and 56 include spacers 55 and 57, respectively. The spacers 55 and 57 project vertically to keep shelf 72 away from the wall 58 and the shroud 60. This improves the circulation of air or steam in the oven chamber 52, which is in the direction of arrow 64. The shroud 60 causes some of the air or steam to be blown past a boiler 66, which is formed as an integral part of the oven chamber 52. FIG. 2 also shows a reed switch 67 which is disposed in the combination oven 20 so as to be concealed by the stainless-steel exterior of the combination oven 20. It will be seen below that the door 22 includes a magnet (see FIG. 6) to operate the reed switch 67 to provide an indication that the door 22 is closed or open. A second reed switch (not shown) is located in a corresponding position in the combination oven 20 on the right side of door 22. The one of the two reed switches that is on the side of the door handle 24 is used to signal closure of the door 22. The magnet operates the reed switch 67 or the reed switch that is not shown through the non-magnetic stainless steel of the door 22 and the combination oven 20.

Water in the boiler 66 is heated by a plurality of heating elements 68, of which only one is visible in FIG. 2. A baffle array 70 deflects any drippings from the stream of heated air or steam following the arrow 64 from contaminating the water in the boiler 66, and also keeps water inside the boiler 66 and out of the rest of the oven chamber 52 and plenum 62. At the same time, the boiler 66 is disposed so as to evaporate steam into the flow in the direction of the arrow 64 and thereby control humidity or steam level in the oven chamber 52. In this way, food placed in trays or the like on one or more of the shelves 72 is exposed to desired conditions of heat and humidity. It can also be seen from an inspection of the racks 54 and 56 and the shelf 72 that trays of food placed on the shelf 72 will be spaced away from the inside wall 58 and the shroud 60 by the spacers 55 and 57 so as to facilitate circulation of heated air or steam around the trays of food.

Figure 3:
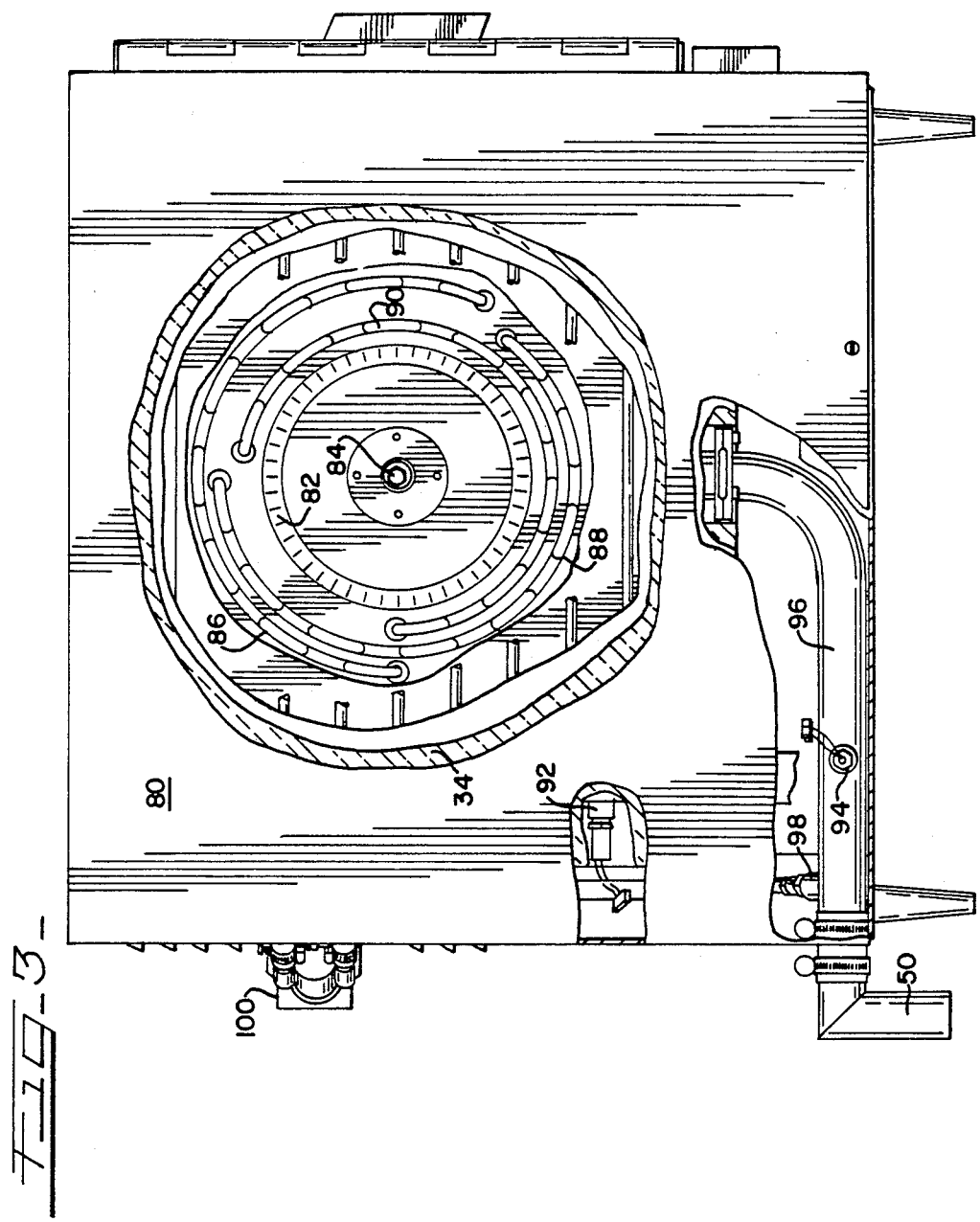
FIG. 3 is a partially cut-away left side view of a specific embodiment of the combination oven of the present invention.

FIG. 3 is a partially cut-away side view of the combination oven 20 as seen from the left side of FIG. 1. In FIG. 3, a wall 80 is protected from the cooking temperatures inside the combination oven 20 by the insulation 34 which in turn is protected from conditions in the oven chamber 52 by the inside wall 58. A blower 82 circulates air and steam through the shroud 60 and into the plenum 62 of FIG. 2 from the oven chamber 52, then out at the top and bottom of the plenum 62 and back into the oven chamber 52. A screw 84 in a blower 82 is placed to serve as a wheel puller of the blower 82 from its shaft, facilitating maintenance of the oven 20. Details of this screw 84 are shown below.

The blower 82 is placed to blow air, steam or both substantially radially through heating elements 86, 88 and 90. Three such heating elements are shown because it is convenient to equip the combination oven so that it can be heated either by single-phase or three-phase electrical systems. The heating elements 86, 88 and 90 are preferably specified for maximum voltages of 208 volts or 240 volts, and the combination oven may be operated either single-phase or three-phase, as shown below. The use of three discrete heating elements provides maximum flexibility in making such connections. It is convenient to make individual heating elements in serpentine or wave shapes which are then bent to form arcs of circles.

Referring to FIG. 3, a preferred array of heating elements 86, 88 and 90 is shown in which each such heating element spans approximately 240° of arc, centered about the blower 82. Identically shaped elements are readily bent to the slightly different radii indicated. Three elements are combined to form two circumferential rings through which air is blown. As a result, when all three heating elements 86, 88 and 90 are powered, air from the blower 82 is heated by contact with two heating elements over the entire circulating circumference. Air then contacts a heated element over 240° of circumference. On low heat, only one such element is used. In either case, the span of the elements provides for an even distribution of heat in the air stream that is produced by the blower 82.

In the illustrated embodiment of the oven of the present invention that has been built, the heating elements 68 of FIG. 2, which were used to heat water in the boiler 66, comprised three helical elements, each rated at three kilowatts. The heating elements 86, 88 and 90 of FIG. 3 were each rated at two and one quarter kilowatts. In any mode in which steam was being used, full power, nine kilowatts, was applied initially to the heating elements 68 of boiler 66 with no power being supplied to heating elements 86, 88, and 90. When water in boiler 66 reached within a few degrees of boiling, connections to the heating elements 68 were changed depending upon the mode selected. In the combo mode, connections were switched to supply one and one half kilowatts to the boiler. This was done by placing two heating elements 68 in series. If the oven was to be operated as a steamer, the heating elements 86, 88, and 90 were not energized, and the blower 82 was operated continuously to circulate saturated steam in the oven. In contrast, if the oven was operated as a combo oven, circulating superheated steam, the heating elements 86, 88 and 90 were cycled between levels of six and three quarter kilowatts and off in response to sensed temperatures as compared with a control setting.

FIG. 3 shows a probe 92 that projects into the oven for sensing temperatures. The probe 92 contains a resistive thermal device (RTD), a thermally sensitive resistor that is typically used as an element in a voltage divider to provide a signal proportional to temperature. Other temperature transducers, such as thermocouples, thermistors, bimetallic devices or the like could be used. Other such probes are shown in another view of the combination oven 20. A probe 94 is inserted in a drain line 96 to measure the temperature in the drain line 96. As spray nozzle 98 is connected into the drain line 96 to maintain a water seal in the drain line 96 and to condensate steam from the combination oven 20.

FIG. 4 is a partially cut-away rear view of the combination oven 20. In FIG. 4, a solenoid valve 100 includes a hose connection 110 for supplying water from an external source. The solenoid valve 100 supplies water through a line 112 to the boiler 66 of FIG. 2. A line 114 is taken from the solenoid valve 100 to the drain line 96. A fitting 116 is attached to the boiler 66 of FIG. 2 to connect it to a drain hose 118. The drain hose 118 is connected to drain line 96 through clamp valve 120. This is a solenoid-operated valve that pinches drain hose 118 by drawing a pinch bar 122 against a stop. This provides the advantages of a valve that is subject to a minimum amount of interference from the build-up of salts from the boiler water, that is selfcleaning in operation, and that permits ready removal and replacement of the drain hose 118. The drain hose 118 is held in place by hose clamps 124 and 126 which facilitate its removal or replacement.

FIG. 5 is a perspective view of the boiler 66 of the combination oven of the present invention. FIG. 5 shows heating elements 140 and 142, in addition to the heating element 68 that is visible in FIG. 2. A wall 144 of the boiler 66 represents a continuation of the oven chamber 52 and the plenum 62 of FIG. 2, so that the boiler 66 is an integral part of the interior of the combination oven 20. In FIG. 5, the baffle array 70 of FIG. 2 is seen to comprise several elements. One of these is a baffle plate 146, which is secured within the boiler 66 by bolts 148 and 150. This serves to hold heating elements 68, 140 and 142 in place. The baffle plate 146 also minimizes effects of the splashing that occurs when water in the boiler 66 is bubbling vigorously. A tab 152 in the baffle plate 146 covers a water temperature sensor which is not shown. A slot 154 in the baffle plate 146 permits passage of the level sensor 74. Level control means 282 (discussed hereinafter) is connected to level sensor 74 for controlling the means for supplying water (solenoid value 100) and the means for draining water (solenoid value 120) to control a level of water in the boiler. Bars 156 and 158 support a baffle cover 160, which is readily removed by the use of a handle 162. The baffle cover 160 includes bars 164 and 166, which are supported by bars 156 and 158. An edge 168 of baffle cover 160 is disposed within the opening of a channel 170, which is affixed to a rear wall 172 of the boiler 66. The assembled position of the baffle cover 160 within the channel 170 is readily seen to form the baffle array 70 of FIG. 2. This comprises a labyrinth that prevents liquid water from entering the plenum 62 of FIG. 2, and minimizes entry of cooking drippings into the boiler 66. The baffle cover 160 slopes toward the center of the oven chamber 52 to direct cooking droppings toward the drain 50 of FIG. 2.

One method of cleaning the combination oven 20 comprises removing the baffle cover 160 of FIG. 5 and placing a cleaning solution in the boiler 66 to a level that at least covers heating elements 68, 140 and 142. The cleaning solution may be vinegar, sulfamic acid, or a commercial degreasing compound. Vinegar is particularly effective at removing lime deposits in the boiler, while sulfamic acid is particularly effective at degreasing the interior of the oven. The oven is cleaned by applying the power to heating elements 68, 140 and 142, while circulating the resulting fumes through the oven. The boiler 66 is then drained by the operating clamp valve 120 of FIG. 4 which drains the boiler 66 through the fitting 116. The boiler may then be flushed by water admitted through the line 112. Entry of water to the boiler 66 and its discharge to the drain line 96 of FIG. 4 are also controlled in response to a number of conditions that will be described below.

FIG. 6 is a view of the door 22 of FIG. 1 from inside the combination oven 20 of FIG. 1, and FIG. 7 is a partial sectional bottom view of the door 22 of FIG. 6. In FIG. 6, a channel 180 covers an opening 182 which exposes a portion of a spring 184. The channel 180 also covers a magnet 186, which operates a reed switch to indicate that the door is open.

As shown in FIG. 6, the channel 180 is on the left and the hinge 26 is on the right. Reversal of the door is effected by removing a hinge pin 188, a hinge plate 190 and the channel 180, to which the spring 184 is attached. The magnet 186 is held in place by the channel 180. A hinge plate 190 is installed on the left side of the oven, the plate 180 is turned upside down from its position in FIG. 6, placing the magnet 186 at the top in FIG. 6, and the door 22 is rotated 180° to place the hinge 26 on the left, the plate 180 on the right, and the magnet 186 at the bottom on the right. The hinge pin 188 is then inserted from the top. The handle 24 is also turned upside down.

A gasket 192, located around the edge of the door 22 as shown, is made of a resilient material, such as silicone rubber or the like, that will withstand oven temperatures and still seal the oven by coming into engagement with the edges of oven chamber 52 of FIG. 2. In FIG. 7, the gasket 192 is seen to have a U-shaped form with a tab 194 that holds the gasket 192 in place. A contact region 196 is molded so as to be thinner in cross-section than the rest of the gasket 192. This facilitates bending of the gasket about a rounded lip 198, which protrudes from the combination oven 20 as an extension of the inside wall 58 of FIG. 2 to make a seal with the gasket 192. The rounded lip 198 is thinner than the width of the gasket 192, so that when the door 22 is closed, a portion of the gasket 192 is wrapped partly around the rounded lip 198, making a seal. This keeps air out of the oven chamber 52 and steam in. However, any buildup of pressure in the oven chamber 52 above a predetermined amount is readily vented as the gasket 192 yields. The inside wall 58 is identified for reference, but rounded lip 198 is disposed in a substantially rectangular pattern as seen from the front of the combination oven 20 to engage the gasket 192 and make a seal. The shape of the gasket 192, as shown in cross-section in FIG. 7, makes it possible to form gasket 192 as a single molding without the need to use re-entrant mold parts. This is in contrast to the typical gasket which is molded as tubing and is cut and joined at the corners. The joint, made by vulcanizing or the like, tends to change the characteristics of such gaskets and make them more difficult to seal. The single-piece molded gasket 192 is free of such joints, which contributes to a more effective oven seal. Replacement of the gasket 192 and cleaning of the door 22 are both facilitated by removal of the hinge pin 188, which allows the door 22 to be removed from the combination oven 20.

FIG. 8 is an expanded cut-away side view of a portion of the door 22, FIG. 9A is a front view showing the spring 184 of FIG. 8, and FIG. 9B is a side view of a the latching bullet 214. In FIGS. 8, 9A and 9B, a screw 200 is attached to the door 22 to secure the spring 184 to a sliding plate 204 in door 22 while permitting rotation of the spring 184 about the center of the screw 200. The plate 204 is also free to pivot about a screw 205. This rotation of the spring 184 allows the spring 184 to make up for considerable amounts of misalignment of the door with respect to the latching bullet 214 that is attached to the combination oven 20 to secure the door 22. The handle 24 is attached to a cam 202 and to the sliding plate 204, which permits relative motion of the handle 24 and the cam 202 with respect to the door 22. Thus, when the handle 24 is moved in the direction of an arrow 206, the cam 202 is forced between prongs 208 and 210 of the spring 184. This spreads the spring 184 to release the door. The insulation 34 in the door 22 is placed throughout the interior of the door 22 except in a region occupied by the spring 184 and the cam 202. Structural support and separation of parts of the door 22 is maintained by a plurality of spacers 212 and by the insulation 34, a structurally rigid piece of insulation board.

FIG. 9B shows the bullet 214 which is fixed in place on the front of the oven 20 to engage the spring 184. Groove 216 in the bullet 214 engages the spring 184, which is spread by the cam 202 to release the spring 184 from groove 216 when the handle 24 of FIG. 8 is lifted. Threads 218 of the bullet 214 are used to secure the bullet 214 to the front of the combination oven 20. If the door 22 is changed to open in a different direction, the bullet 214 will have to be moved to engage the spring 184 on a different side. A mounting hole for the side of the door that is not used is covered by the hinge plate 190 of FIG. 6.

Figure 10:
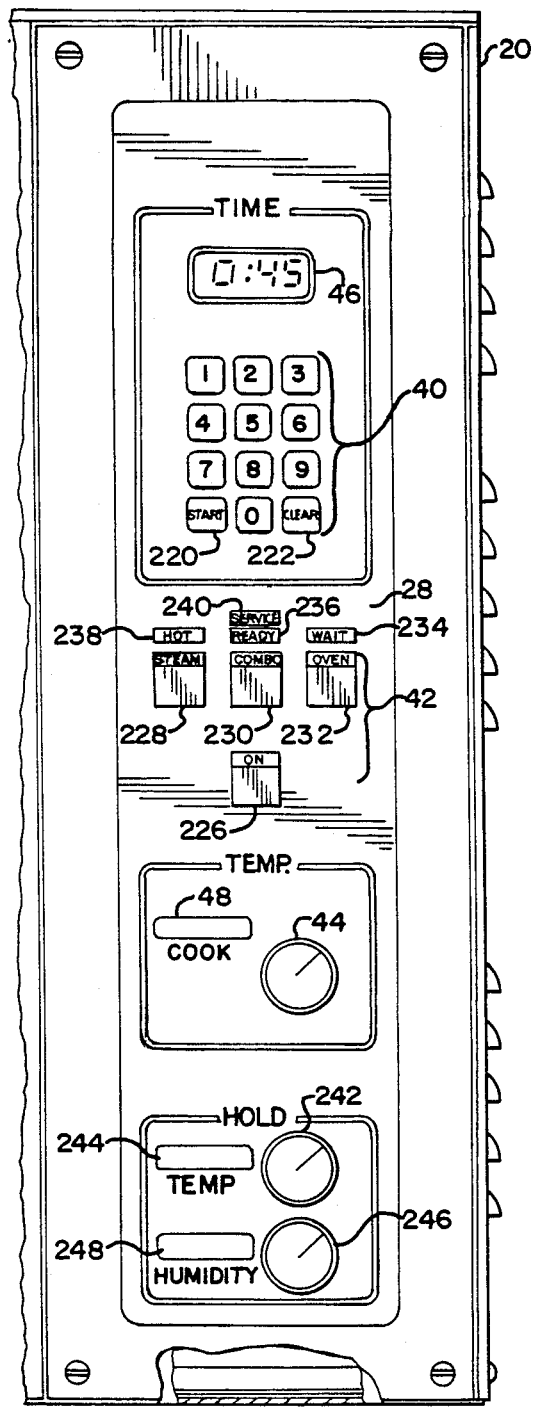
FIG. 10 is an expanded view of a specific embodiment of the control panel of the combination oven of FIG. 1.

FIG. 10 is an expanded view of the control panel 28 of FIG. 1. In FIG. 10, the key pad 40 comprises a complete set of numbers and also a start button 220 and a clear button 222. The time display 96 displays hours and minutes, with the hours separated by a colon that flashes once per second to indicate that the timer is operating. The display on the time display 46 is cleared either by timing out or by the use of a clear button 222. Normal operation of the oven will comprise entering a desired cooking time by the use of the numerical keys of the key pad 40 after the combination oven 20 has reached a preset cooking temperature and displayed a "ready" light. Use then of the start button 220 begins a countdown so that a time display 224 shows remaining time to cook. It is also possible to use the time display 224 to display elapsed time.

A set of push buttons 42 provides for the selection of a mode and for turning combination oven 20 on and off. Thus, the push buttons 42 include an on-off switch 226 and a steam select button 228, a combo select button 230 and an oven select button 232. When a temperature and mode are selected and the cold combination oven 20 is turned on by the use of the push buttons 42, a wait light 234 will normally indicate that the combination oven 20 is heating to the desired temperature. A ready light 236 will then light to indicate that the desired temperature has been reached. A hot light 238 will normally provide an indication only when the selected temperature has been changed to a lower value for an oven that is already hot. That temperature is selected by turning the dial 44 to select the temperature that appears in the display 48. A service light 240 provides an indication that a diagnostic program has detected one or more malfunctions in the operation of the oven.

FIG. 10 also shows controls for features that are optional, but that add greatly to the versatility of the combination oven 20. A hold temperature dial 242 allows the selection of a holding or proofing temperature that is displayed in a display 244. A humidity dial 246 allows the selection of a humidity range that is displayed on a display 248. The temperature and humidity selected by the dials 242 and 246 are useful in two situations. First, temperature and humidity may be set by the dials 242 and 246, respectively, and a time, a temperature and a cooking mode may be selected by the key pad 40, the dial 44, and one of the select buttons 228, 230 or 232. When this happens, the combination oven 20 will perform as selected to cook food until the time displayed on the time display 46 reaches zero. The oven 20 will then hold food at a temperature and humidity selected by the dials 242 and 246. This temperature is typically lower than the cooking temperature, to keep cooked food ready to serve. A second mode of operation is use of the oven to proof dough. This is allowing dough to rise under conditions of controlled temperature and humidity. To proof, the desired temperature and humidity are selected on the dials 242 and 246, and the start button 220 is pressed. This operates the oven under the control of the selected temperature and humidity without first going through a cooking stage. In either case, the humidity is controlled by use of measurements of temperature of boiler water and circulating air. These are analogous to a wet- and drybulb measurement of temperature, which is a well-known way of measuring relative humidity.

FIG. 11 is a functional block diagram of a specific microprocessor arrangement for controlling the oven 20 of the present invention. In FIG. 11, manual inputs 260 and automatic inputs 262 represent respectively the setting of switches, knobs, and the like, and the generation of inputs from sensors and automatically operated switches. Both outputs are taken to a multiplexing analog-to-digital (A/D) converter 264, which generates data inputs to a microcomputer 266. The microcomputer 266 is served by a read-only memory (ROM) 268, which stores an operating program for the microcomputer 266. A random-access memory (RAM) 270 provides volatile memory for the microcomputer 266, and an electrically erasable programmable read-only memory (EEPROM) 272 supples non-volatile memory for such functions as repeating the last previous cooking cycle. This enable a chef, for example, to enter a cooking time that is stored so that when he wishes to repeat the same cooking cycle, he need only load the oven, close the door, and press the start button. Outputs from the microcomputer 266 are taken to a digital-to-analog (D/A) converter 274 where they provide signals that are taken to control displays 276, a heater control 278, a fan control 280, a water-level control 282, and an alarm 284. Details of operation of control systems will be disclosed in the flow charts that follow.

Figure 12:
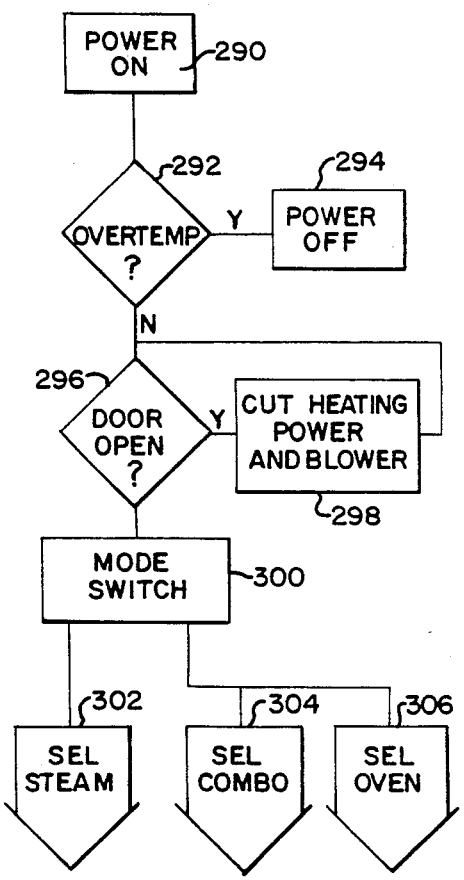
FIG. 12 is a flow chart of a specific embodiment of the power-up sequence of the combination oven of FIG. 1.

FIG. 12 is a flow chart of the sequence of operations controlling the oven 20 after power-up. In FIG. 12, a block 290 results from operating the on switch. A decision block 292 tests for overtemperature. An overtemperature sensor in the oven chamber and another overtemperature sensor in the plenum chamber will direct a block 294 to turn the power off if overtemperature is detected. If it is not, a decision block 296 tests for an open door. If the door is open, a block 298 cuts heating power and the oven stands by for further instructions. If the door is closed, a mode switch 300 calls for the selection of a block 302, steam; a block 304, combo; or a block 306, oven.

FIG. 13 is a flow chart of operation in the oven mode. In FIG. 13, a block 310 is engaged by selecting oven and setting a temperature by means of the oven select button 232 and the dial 44 of FIG. 10. A block 312 causes the blower 82 of FIG. 3 to turn on. A decision block 314 then tests for whether the temperature is in range. If the temperature is not in range, a decision block 316 tests to see whether the temperature is low. If the temperature is low, a block 318 turns on the "wait" light 234 and a block 320 calls for high oven heat. Operation continues with the heat high and the "wait" light 234 on. If the temperature is not in range and is not low, a decision block 322 tests to see if the temperature is high. If the temperature is neither low nor high, an error indication 324 switches control to a service routine. If the temperature is high, a block 326 switches the oven heat off and a block 328 calls for the "hot" light 238, which stays on until the temperature is no longer high. If the decision block 314 indicates that the temperature is in range, a block 330 switches the oven heat to low, and a block 332 calls for the "ready" light 236. These conditions will continue until the block 332 receives a power-off indication, in which case control exits to an off circle 334. The power-off switch 226 may be operated manually, or the "off" condition may be operated by timeout of the timer.

FIG. 14 is a flow chart of operation in the combination oven sequence. This is the mode in which steam is superheated when it is circulated through the heating elements 86, 88 and 90 by the blower 82. In FIG. 14, a block 340 indicates that the "combo" mode has been selected. This is done by pushing "combo" button 230 and pressing the on button 226. A block 342 calls for the blower 82 to run. A block 344 indicates that cooking time should be set, but this is not necessary. The "combo" mode comes to "ready" without setting a cooking time. A decision block 346 then tests the boiler temperature. If the temperature is less than a predetermined value, here indicated as 205° F., a block 348 calls for boiler heat to be at full power (9 kilowatts) and a block 350 calls for a "wait" light 234. The predetermined temperature that affects the change of the decision block 346 may be set in the program by the programmer, based upon parameters such as the altitude at which the oven is to operate, or it may be determined adaptively within the oven as a predetermined number of degrees below the ambient boiling temperature. However the limit is set, when the decision block 346 determines that the boiler temperature has reached or exceeded the preset temperature, a block 352 turns boiler heat off. A decision block 354 then tests to see whether the oven chamber 52 is at the set temperature. If it is not, a block 356 tests to see whether it is over the set temperature. If it is not, a block 357 calls for high oven heat and a block 358 calls for the "wait" light 234. This condition continues until the decision block 354 determines that the oven chamber 52 is at the set temperature. In the alternative, if the temperature setting has been reduced for a hot oven, the decision blocks 354 and 356 will indicate that the oven chamber 52 is over the set temperature. In this case, a block 360 will turn the oven heat off and a block 362 will light the "hot" light 238.

One or the other of the two loops just described will continue until the oven chamber 52 reaches its set temperature, at which time control exits from the decision block 354 to a block 364. This sets the oven heat to low. A block 366 lights the "ready" light 236. If cooking time has not been set at the block 344, the oven chamber 52 will maintain the preset temperature by looping in the control blocks just described. This is either a waiting mode, awaiting the insertion of food into the oven, or it is a cooking mode. The combo oven can be used without using the timer. If it is desired to be used with the timer, then a block 368 starts the timer countdown. This is engaged by setting a time on the timer 46, if a time has not been set, and by pushing the "start" button 220. A decision block 370 then tests whether the timer has timed out. If it has not, control returns to the cooking cycle. If the timer has timed out, a decision block 372 tests whether the "hold" is set by dial 242. If it is, control passes through a block 373 to the "hold" mode. If "hold" is not set, or if the oven does not include the "hold" option, the decision block 372 passes control to a block 374, which turns off the oven power to the heating elements and the blower. A block 376 sounds a buzzer for a predetermined time interval, and a stop circle 378 indicates that the oven has stopped its cooking cycle.

Figure 15:
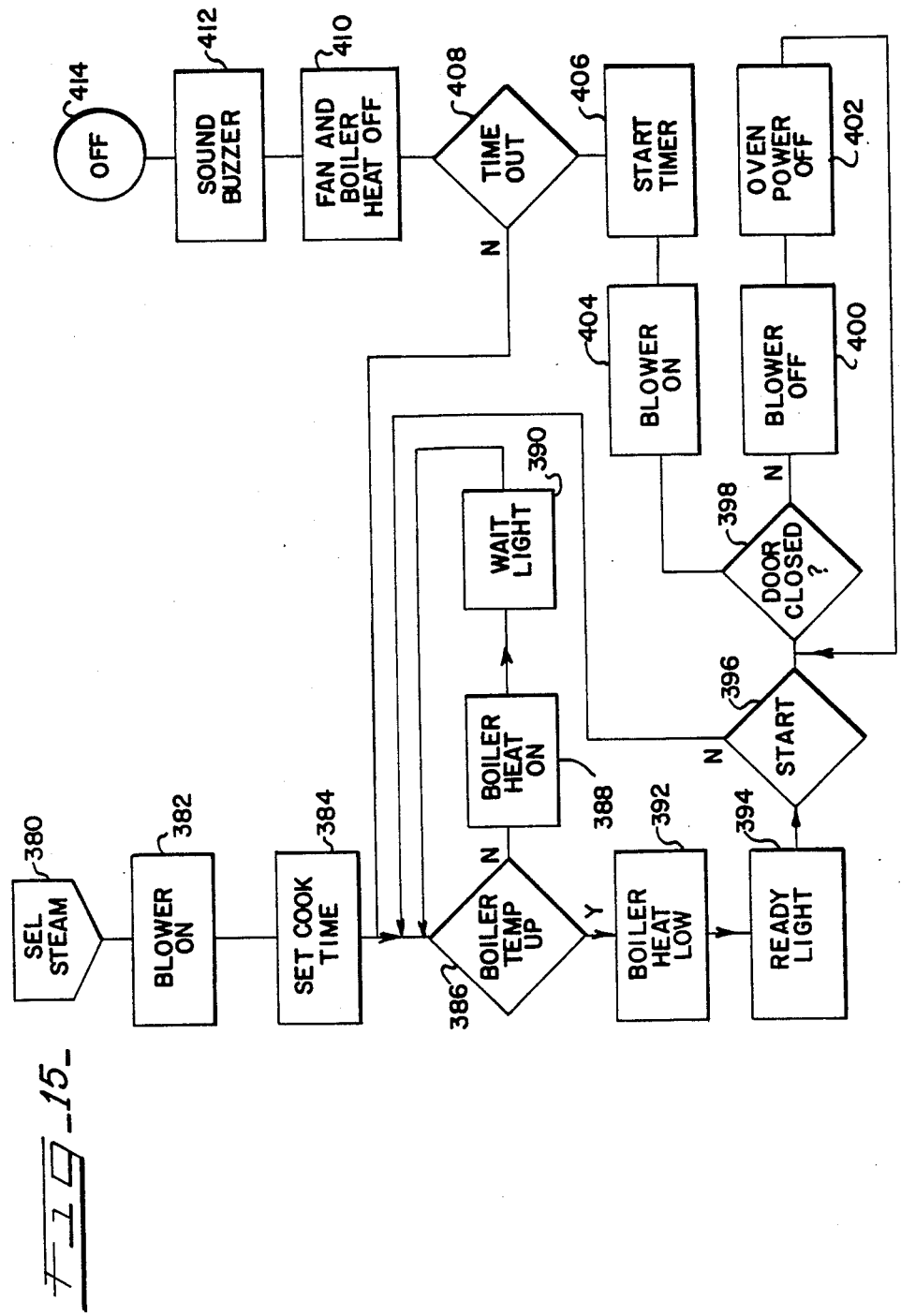
FIG. 15 is a flow chart of a specific sequence of operation in the steam mode.

FIG. 15 is a flow chart of operation in the steam mode. When steam is selected, as indicated by a selection block 380, a block 382 calls for the blower 82 to operate. A block 384 calls for the setting of a cooking time, and a decision block 386 tests to see if boiler temperature is at the boiling temperature. If it is not, a block 388 calls for boiler heat to be on full, and a block 390 lights the "wait" light 234. This continues until the decision block 386 indicates that the boiler temperature is up. A block 392 then shifts boiler temperature to a "low" setting, and a block 394 calls for a "ready" light 236. A decision block 396 tests to see if the "start" button 220 has been pressed. If it has not, operation cycles in a "ready" mode. If "start" is engaged, a decision block 398 tests to see if the door 22 is closed. If it is not, a block 400 assures that the blower 82 is off, and a block 402 interrupts power to the boiler heating elements 68, 140 and 142. If the door 22 is closed, a block 404 calls for operation of the blower 82, and a block 406 starts the timer. A decision block 408 tests whether the timer has timed out. If it has not, the steam cycle continues. If the timer has timed out, a block 410 turns off the blower 82 and the boiler heat. A block 412 calls for the buzzer to sound for a predetermined time, and a stop circle 414 indicates that the cooking operation is ended. The steam mode is operated so as to require the use of a timer. This is a matter of design choice.

FIG. 16 is a flow chart of operation in the hold or proof mode. In FIG. 16, a selection block 420 indicates that hold or proof has been selected by dial 242. This entry may be made as a result of timing out from the use of one of the oven modes, or it may be entered directly. Direct entry is the usual way for using the oven to proof dough. It may also be desirable to cook under conditions of controlled humidity or at the lower temperature available in the hold or proof mode. In any event, when the hold or proof mode is entered, as indicated by the selection block 420, a block 422 checks to see that the blower 82 is on, and a block 424 checks to see that the hold temperature has been set by dial 242, while a block 426 checks to see that hold time is set. A decision block 428 then tests to see if a humidity setting has been made by dial 246. If a humidity setting is made, a block 430 calls for a reading of boiler temperature, and a block 432 calls for the oven temperature. These are essentially wet- and dry- bulb readings which can be taken to a look-up table in ROM 268 or EEPROM 272 or the like, from which a block 434 calculates the humidity in the oven. A decision block 43 tests whether the humidity is within limits. If it is not, a decision block 438 tests to see if the humidity is high. If it is, this means that the boiler temperature is too high and a block 440 calls for blowdown. This represents opening the solenoid valve 100 and admitting cold water until the boiler temperature is at a proper value. Level control means 282 connected to level sensor 74 controls the means for supplying water (solenoid value 100) and the means for draining water (solenoid value 120) to control the level of water in the boiler by blowdown and replacement until the boiler temperature is at the proper value. If the humidity is not in limits and is not high, the block 432 selects low boiler heat. When the decision block 436 indicates that the humidity is in limits, a block 444 calls for the boiler heat to be turned off. Control then passes to decision a block 446, which tests to see if the oven temperature is in limits. If it is, and if a decision block 448 indicates that the hold timer is running, then a block 450 calls for low oven power and the control cycle repeats. If the hold timer times out, control passes to an off circle 452, and the oven is turned off. If the decision block 446 receives an indication that the oven temperature is out of limits, a decision block 454 tests to see if the temperature of oven chamber 52 is high. If it is, a block 456 calls for oven power to be turned off, and control is in this mode until the temperature of oven chamber 52 again comes within limits. If the temperature of oven chamber 52 is out of limits and is not high, then the decision block 454 passes control to a block 458, which calls for high oven power.

FIG. 17 is a flow chart showing the control of boiler water level. A selection block 470 indicates that boiler water is called for in cooking. This means that the combo oven is either in the combo or steam mode. If the combo oven is operated in the oven mode, boiler water is not called for, and the boiler is empty with the clamp valve 120 open. The boiler water is called for by operation of a decision block 472 which tests whether high water level is sensed in the boiler. If it is not, a decision block 474 tests to see whether a low water level is sensed in the boiler. If it is, a block 476 orders the solenoid valve 100 opened. If the low level is not sensed, a block 478 calls for the water to be turned off in the boiler. A block 480 times the fill, as the boiler is allowed a set time to fill. If the time is out of limits, a decision block 482 calls for a shutdown circle 484, and the oven is shut down. If the time of fill is within limits, control returns to the decision block 472. If the high level is sensed, a block 486 directs that the water valve be closed. A decision block 488 then tests whether the low level is sensed. If the low level is not sensed by the decision block 488 when the high level is sensed by the decision block 472, then a block 490 detects that there is an error in the sensors. One or more of the sensors may have failed. A block 492 directs the display of an error signal, and shutdown signal 494 shuts the oven down. If the low level is sensed in the decision block 488, control returns to the decision block 472, and the cycle continues.

FIG. 18 is a flow chart showing the operation of the cooldown mode for the combination oven. In FIG. 18, a selection block 500 indicates that the cooldown mode has been activated. This is done when one of the modes, steam, combo, or oven has been selected. A decision block 502 tests whether the door 22 is open. If it is not, the cooldown mode has not been selected, and a block 504 directs exit. If the door is open, a decision block 506 tests whether the "hot" light 238 is on. This is an indication that the temperature setting has been changed to a lower value, calling for oven cooldown. If the "hot" light 238 is not on, a block 508 directs exit from the cooldown mode. If the "hot" light 238 is on, a block 510 tests to see if the "start" button 220 has been depressed. Depressing the "start" button in a hot oven with the door 22 open causes a block 512 to turn the heater off and a block 514 to run the blower 82. This speeds the cooldown process which continues as long as the oven chamber 52 is above the new set temperature. When the oven chamber 52 is cooled to the new set temperature, the decision block 506 directs control to the block 508, which exits from the cooldown mode.

FIG. 19 is a combination front, side and bottom view of the shroud 60 of the present invention. The shroud 60 comprises a wall section 600 that includes an opening 602 through which the blower 82 of FIG. 3 circulates air that is heated by the heating elements 86, 88 and 90 of FIG. 3. End walls 604 and 606 include cutouts 608 and 610 in the end wall 604, and corresponding cutouts (not shown) in the end wall 606 that are adapted to hang the shroud 60 on pins inside the oven chamber 52. The shroud 60 is hung by the cutouts 608, 610, and the corresponding cutouts in the end wall 606. The opening 602 serves as a blower shroud to guide air to blower 82. At the same time, the plenum 60 is readily lifted and removed for cleaning and for access to the boiler 66 of FIG. 2.

FIG. 19 also gives a detailed view of the rack 56 which is seen to provide seven shelf supports 612. Risers 614 and 616 serve to space shelves away from shroud 60 to improve the circulation of air in the oven chamber 52.

FIG. 20 is a combination top, side, and end view of the shelf 72 of FIG. 2. The shelf 72 comprises a pair of side rods 624 and 626 that engage the shelf support 612 of FIG. 19 to support the shelf 72. A plurality of support rods 628 supports trays in position in the combination oven 20, and these trays are spaced away from the interior of the oven 20 by a pair of spacer rods 630 and 632. The spacer rods 630 and 632 maintain free circulation of air within the combination oven 20. The shelf 72 is kept from tipping by a pair of hooks 634 and 636 that engage the racks 54 and 56 of FIG. 2.

FIG. 21 is a sectional view through the center of the shaft of the blower 82 of FIG. 3. In FIG. 21, a shaft 644 is connected to a motor which is not shown. A hub 646 is pressed on the shaft 644 to couple torque to the blower 82. The screw 84 is sized to fit the threads 648 in the hub 646 and press against the shaft 644 to separate the shaft 644 from the hub 646. A key 650 assists in preventing relative turning motion between the hub 646 and the shaft 644.

FIG. 22 is a connection diagram showing the means of achieving different levels of heating power using the same relays for single-phase power and threephase power that is supplied to the boiler heating elements 68, 140 and 142. In FIG. 22, a terminal block 660 is adapted either to bring in single-phase ac power on lines 662 and 664 or else to bring in threephase power on lines 662, 664 and 666. A connection plug 668 is shown here in a position to select singlephase ac. The position 670, shown in dotted lines, selects single-phase power. The relay contacts 672, 674, 676, 678 and 680 are operated as follows to make different connections to the boiler heating elements 68, 140 and 142. When all the relay contacts 672-680 are open, no power is supplied to the heating elements 68, 140 and 142. When the relay contacts 672, 674, 676 and 678 are closed and the relay contact 680 is open, each of the heating elements 68, 140 and 142 receives full voltage and each delivers three kilowatts for a total boiler power of nine kilowatts. This is applied during the steam mode and during the period when the combo oven 20 is beginning to heat. With the relay contacts 672, 676 and 678 open and the relay contacts 674 and 680 closed, the heating elements 68 and 140 are placed in series across the ac voltage, supplying a total of 1.5 0963 kilowatts.

The combination oven 20 of the present invention operates in response to manual inputs and also to inputs from various sensors. These inputs are coupled to the microprocessor where they are processed to control a number of quantities and also to produce display information. Table 1 is a list of the parameters sensed in combination oven 20.

TABLE 1

Parameters Sensed in Combination Oven 20

Temperature in Oven Chamber 52
Water High Level in Boiler 66
Water Low Level in Boiler 66
Water Temperature in Boiler 66
Over Temperature in Oven Chamber 52
Temperature of Liquid in Drain Line 96
Light at relay contact Table 2 is a list of the switches and controls, both manually and automatically operated, that provide inputs to control combination oven 20. It should be noted that the combination oven 20 can be operated without the proof and hold feature. If this is done, certain of the features of Tables 2, 3 and 4 will not be needed.

TABLE 2

Switches and Controls in Combination Oven 20

On-Off
Mode: Steam, Combination, Oven
Oven Temperature
Time
Holding Temperature
Holding Humidity
Start
Clear
Door Open Table 3 is a list of the quantities and elements controlled by the microprocessor of the present invention in response to the inputs from the sensed parameters of Table 1 and the switches and controls of Table 2. The microprocessor used was an Intel 8031.

TABLE 3

Items Controlled in Combination Oven 20

Water Level in Boiler 66
Air Temperature in Oven Chamber 52
Humidity in Oven Chamber 52
Electric Power to Boiler Heating Elements 68
Electric Power to Oven Chamber Heating Elements 86, 88 and 90
Boiler Temperature
Boiler Blowdown
Time to Fill Boiler
Over Temperature
Cooking Time
Holding Temperature
Drain Valve
Condensate Spray
Timing at Relay Closing & Opening The microprocessor of the present invention controls various displays to assist an operator of the combination oven 20. Table 4 is a list of those displays.

TABLE 4

Displays in Combination Oven 20

Cooking Time
Service
Hot
Ready
Wait
Steam
Combo
Oven
On
Cooking Temperature
Holding Temperature
Humidity
Alert Buzzer (cooking timeout)
Colon Flash (timer running)

The description of specific embodiments of the present invention is intended to set forth the best mode known to the inventors for the practice of their invention. It should be taken as illustrative and not as limiting, and the scope of the invention should be limited only by the appended claims.

What is claimed is:

1. An oven adapted for cooking by forced circulation of superheated steam comprising:
   a. an enclosure;
   b. an oven chamber disposed in the enclosure;
   c. a boiler disposed in the oven chamber;
   d. means for supplying water to the boiler;
   e. means for electrically heating water in the boiler to produce steam;
   f. means for draining water from the boiler;
   g. an electric heating element disposed in the oven chamber to heat steam;
   h. a blower fan disposed to circulate superheated steam in the oven chamber through the electric heating element to heat the oven chamber;
   i. means disposed in the oven chamber for sensing temperature in the oven chamber;
   j. means disposed in the enclosure and outside of the oven chamber for controlling electric power to the electric heating element in response to the sensed oven chamber temperature;
   k. means for sensing a level of water in the boiler;
   l. means connected to the level sensing means for controlling the means for supplying water and the means for draining water to control a level of water in the boiler;
   m. means for sensing the temperature of water in the boiler; and
   n. means connected to the water temperature sensing means for controlling inlet and outlet of water to the boiler to achieve a desired temperature of water in the boiler.

2. An oven according to claim 1 comprising in addition:
   a. a microprocessor; and
   b. electronic circuitry connected to the microprocessor for receiving inputs from the means for sensing temperature in the oven chamber and from the means for sensing temperature of the boiler water to process information to control the circulating fan and the means for controlling electric power to the chamber electric heating element and the boiler electric heating means.

3. An oven adapted for cooking by forced circulation of superheated steam comprising:
   a. an enclosure;
   b. an oven chamber disposed in the enclosure;
   c. a boiler disposed in the oven chamber;
   d. means for supplying water to the boiler;
   e. means for heating water in the boiler to produce steam;
   f. means for draining water from the boiler;
   g. an electric heating element disposed in the oven chamber to heat steam;
   h. a blower fan disposed to circulate superheated steam in the oven chamber through the electric heating element to heat the oven chamber;
   i. means disposed in the oven chamber for sensing temperature in the oven chamber;
   j. means disposed in the enclose and outside of the oven chamber for controlling electric power to the electric heating element in response to the sensed temperature;
   k. an enclosure door having a latching spring and a latching bullet that is attached to the oven for engaging the latching spring in the door to the latching bullet to latch the door; and a swivel mount holding the latching spring to adjust for relative misalignment between the door and the latching bullet;
   l. a groove in the latching bullet disposed to engage the latching spring to latch the door in a closed position;
   m. a door handle operatively connected to the enclosure door and to a cam to open the latching spring and release the door;
   n. a molded gasket including a sealing portion that is substantially U-shaped and a tab portion adapted to be secured to the door;
   o. an enclosure lip disposed to make sealing contact with the molded gasket;
   p. a hinge including a removable hinge pin mounted on the door;
   q. a hinge plate that is attachable to the oven on a left side and a right side of the door to enable the door to open from the left and the right; and,
   r. a sliding plate attached to the door handle and the cam, said sliding plate being disposed to slide with respect to the door, the sliding plate moving the cam into engagement with the latching spring when the door handle is lifted to spread the latching spring and release the latching spring from engagement with the groove in the latching bullet.

4. An oven according to claim 3 wherein the sliding plate can be inverted to enable the door handle to be lifted to release the door from either side.

5. An oven comprising:
a. an enclosure;
b. an oven chamber disposed in the enclosure;
c. a boiler disposed in the oven chamber;
d. means for supplying water to the boiler;
e. means for heating water in the boiler;
f. means for draining water from the boiler;
g. an electric heating element disposed in the oven chamber;
h. a blower fan disposed to circulate superheated steam in the oven chamber through the electric heating element to heat the oven chamber;
i. means disposed in the oven chamber for sensing temperature in the oven chamber;
j. means disposed in the enclosure and out side the oven chamber for controlling electric power to the electric heating element in response to the sensed temperature;
k. means for sensing a level of water in the boiler;
l. means connected to the sensing means for controlling the means for supplying water and the means for draining water to control a level of water in the boiler;
m. means for sensing the temperature of water in the boiler; and
n. means connected to the temperature-sensing means for controlling inlet and outlet of water to the boiler to achieve a desired temperature of water in the boiler.

6. An oven of claim 5 comprising in addition:
a. a microprocessor; and
b. electronic circuitry connected to the microprocessor for receiving inputs from the means for sensing temperature in the oven chamber and to the means for sensing temperature of the boiler water to process information to control the circulating fan and the means for controlling electric power to the electric heating element and the boiler.

7. An oven of claim 5 wherein the enclosure comprises in addition a door having a latching spring and a latching bullet that is attached to the oven, whereby the latching spring in the door engages the latching bullet to latch the door; and wherein the latching spring is mounted in a swivel mount to adjust for relative misalignment between the door and the latching bullet.

8. An oven of claim 7 comprising in addition:
a. a groove in the latching bullet disposed to engage the latching spring to latch the door in a closed position;
b. a door handle operatively connected to the door and to a cam to open the latching spring and release the door.
c. a molded gasket including a sealing portion that is substantially U-shaped and a tab portion adapted to be secured to the door;
d. a lip disposed to make sealing contact with the molded gasket;
e. a hinge including a removable hinge pin; and
f. a hinge plate that is attachable to the combination oven on a left side and a right side of the door to enable the door to open from the left and the right; and
g. a sliding plate attached to the door handle and the cam, the sliding plate disposed to slide with respect to the door, the sliding plate moving the cam into engagement with the latching spring when the door handle is lifted to spread the latching sprint and release the latching spring from engagement with the groove in the latching bullet.

9. An oven of claim 8 wherein the sliding plate can be inverted to enable the door handle to be lifted to release the door from either side.

* * * * *